July 19, 1960  E. HUDELEY  2,945,418
STEREOSCOPIC FILM STRIP VIEWER
Filed March 14, 1958  4 Sheets-Sheet 1

INVENTOR
EDOUARD HUDELEY
BY Irwin S. Thompson
ATTY.

July 19, 1960  E. HUDELEY  2,945,418
STEREOSCOPIC FILM STRIP VIEWER
Filed March 14, 1958  4 Sheets-Sheet 2

INVENTOR
EDOUARD HUDELEY
By Irwin D. Thompson
ATTY.

July 19, 1960
E. HUDELEY
2,945,418
STEREOSCOPIC FILM STRIP VIEWER
Filed March 14, 1958
4 Sheets-Sheet 3
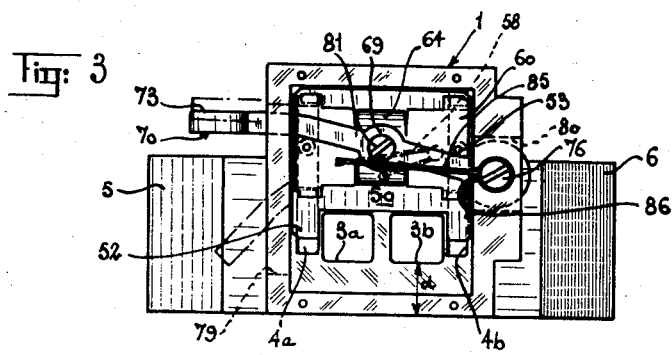
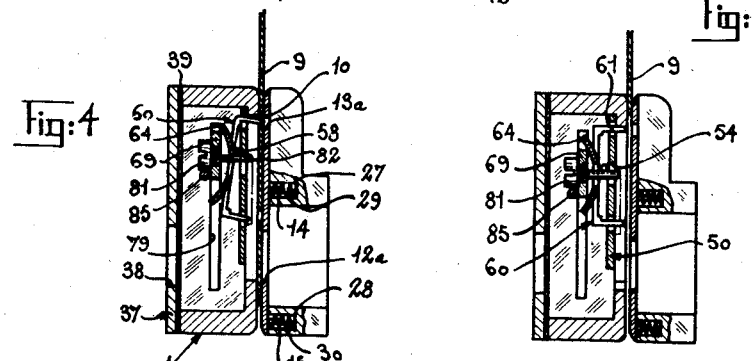
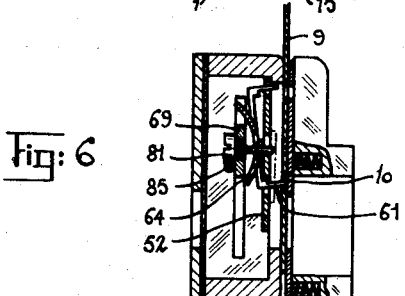
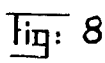
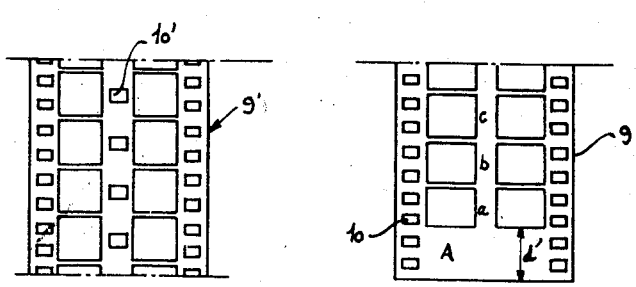
INVENTOR
EDOUARD HUDELEY
By Irwin S. Thompson
ATTY.

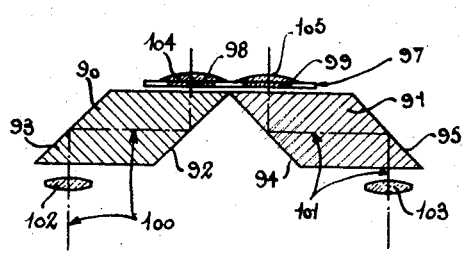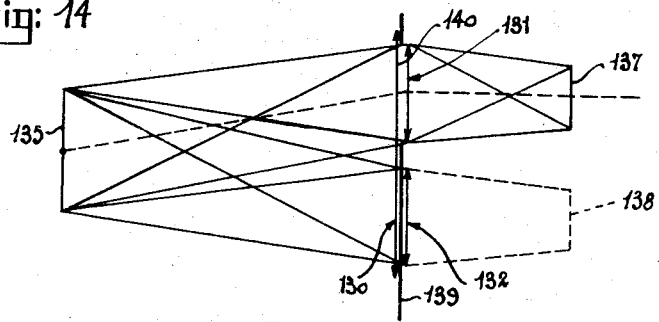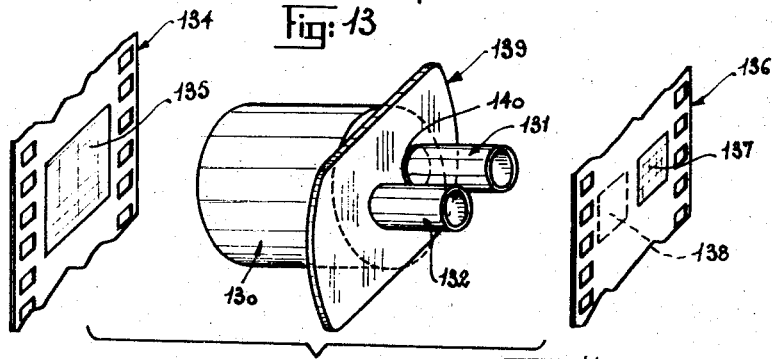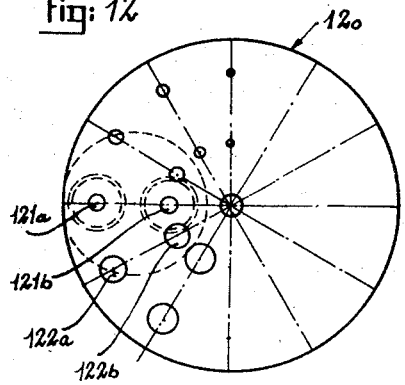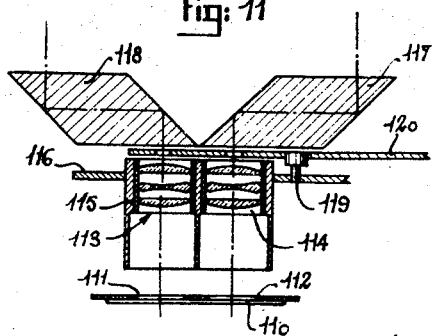

2,945,418

STEREOSCOPIC FILM STRIP VIEWER

Edouard Hudeley, Clichy, France, assignor, by mesne assignments, to Librairie Hachette, Paris, France, a corporation of France Filed Mar. 14, 1958, Ser. No. 721,584

Claims priority, application France Mar. 14, 1957

3 Claims. (Cl. 88—31)

My invention has for its object improvements in methods and means for obtaining and controlling pairs of stereoscopic pictures, chiefly those executed on a conventional kinematographic film.

It has already been proposed to use such films for carrying pairs of pictures by reason of the low cost price of the support thus provided which is however of an excellent grade, both for black and white and for color photographs.

My invention has more particularly for its object the production of pairs of stereoscopic pictures on a conventional kinematographic film, together with a stereoscope incorporating a set of mirrors for observing said pairs, which stereoscope is sturdy and of a reduced bulk and it also covers the means for obtaining such pairs of pictures.

My improved film obtained on a conventional kinematographic strip-shaped support of a breadth of 35 mm. is characterized in particular by the fact that the film being driven vertically into movement through its perforations, the pictures of each stereoscopic pair are arranged to either side of the longitudinal axis of said film, two perforations of each row being associated with each pair of pictures.

Such a film includes thus 105 stereoscopic pairs per meter which allows reducing its cost price.

A stereoscope of the type incorporating a set of mirrors according to my invention is more particularly intended for the viewing of pairs of stereoscopic images produced on a conventional kinematographic film of a breadth of 35 mm. provided with a double series of perforations. Its main novel feature consists in that it includes to either side of a common transverse partition optical means carrying stereoscopic viewing means well known per se, including a film-pressing plate urging the film against the partition and a mechanism for driving said film, said partition including two gates adapted to register with the pictures of a pair of pictures on the film moving over the partition and two lateral cuts registering with the perforations of the film and allowing the driving member of said mechanism to engage said perforations.

Such an arrangement allows obtaining a particularly compact stereoscope which may in fact be advantageously executed by means of plastic material molded through injection, which leads to a lower cost price.

Further advantages and features of my invention will appear from the reading of the following description given by way of example, reference being made to the accompanying drawings wherein:

Fig. 3 is a rear view of said mechanism when fitted in position.

Figs. 4, 5, 6 and 7 illustrate successive operative stages of said mechanism.

Figs. 8 and 9 show two sections of a stereoscopic film executed in accordance with my invention.

Figs. 10, 11 and 12 relate to means for the direct production of stereoscopic pictures on a standard film.

Figs. 13 and 14 illustrate a method for the indirect production of a standard film.

Figure 1:
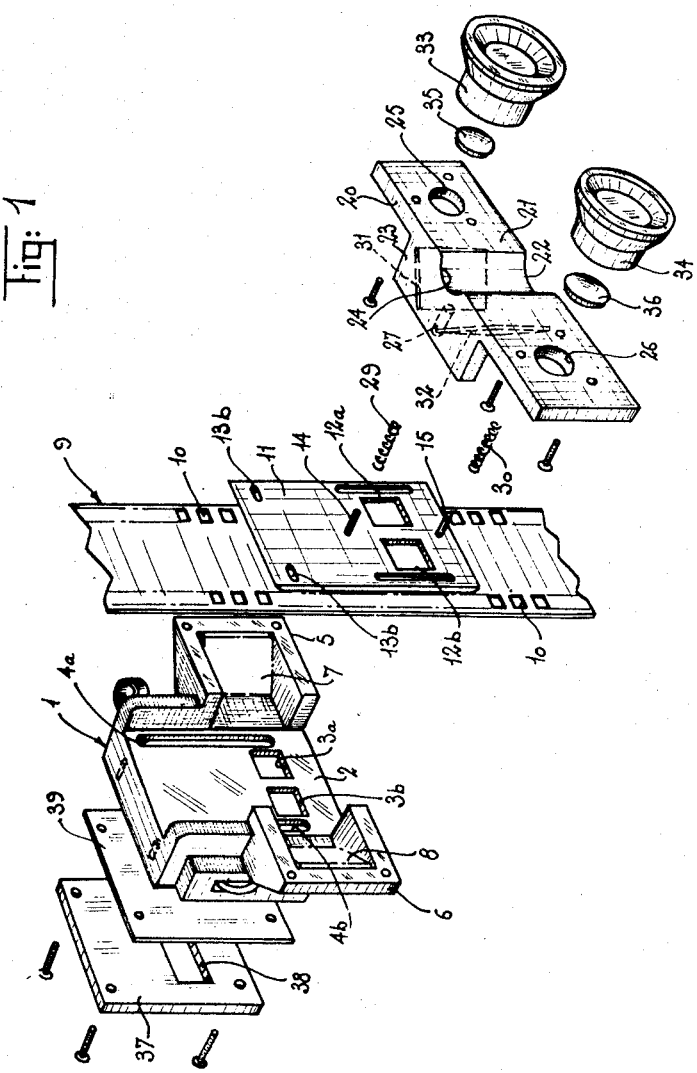
Fig. 1 is an exploded view of a stereoscope of the type incorporating a set of mirrors and designed according to my invention.

The casing 1 which is made for instance of plastic material includes a transverse partition 2 in the lower section of which are provided two gates 3a and 3b, the sizes of which correspond with that of the film pictures (say 9 x 10 mm.) while two lateral elongated cuts 4a and 4b are provided in said plate for the passage of the projections of a film driving member as disclosed hereinafter. The partition 2 is rigid with two bevel-walled sections 5 and 6 projecting outwardly and inside which are housed two marginal mirrors 7 and 8 measuring say 16 x 16 mm. arranged orthogonally with reference to each other and at 45° with reference to the optic axis of the stereoscope, said mirrors being constituted advantageously in an economical manner by means of a metal sheet for instance. In contact with the transverse partition 2 and on the side facing the observer, i.e. towards the right hand side of Fig. 1 are arranged in succession the stereoscopic film 9 with its marginal perforations 10 and beyond the film a film presser plate 11 provided with two gates 12a and 12b facing the gates 3a and 3b in the partition and with two short transverse slots 13a and 13b at the upper end of said plate and adapted to register with the upper ends of the corresponding cuts 4a and 4b in the partition, while lastly said plate 11 carries along its vertical axis of symmetry and respectively slightly above and slightly below the gate area 12, two tenons 14 and 15. The eye-pieces are fitted in a holder 20 which forms a half-casing with the partition on the side facing the observer, as provided by its front partition 21, a lower partition 22 and an upper partition 23, said partitions being adapted to engage through their free edges the film pressing member 11, the partition 22 being concealed by the partition 23 in Fig. 1. A semi-cyclindrical vertically extending groove or depression 24 is provided to the front of the front partition 21 while two apertures 25 and 26 facing the marginal mirrors 7 and 8 are formed in said front partition adjacent the corresponding ends thereof.

Two inner mirrors 31 and 32 orthogonal with reference to each other and parallel with the marginal mirrors 7 and 8 respectively are secured to the eye-piece holder in registry with the gates 3a and 3b, while the mountings 33 and 34 for the eye-piece lenses 35 and 36 are secured to the holder in front of the above-mentioned apertures 25 and 26 facing said marginal mirrors 7 and 8.

Figure 2:
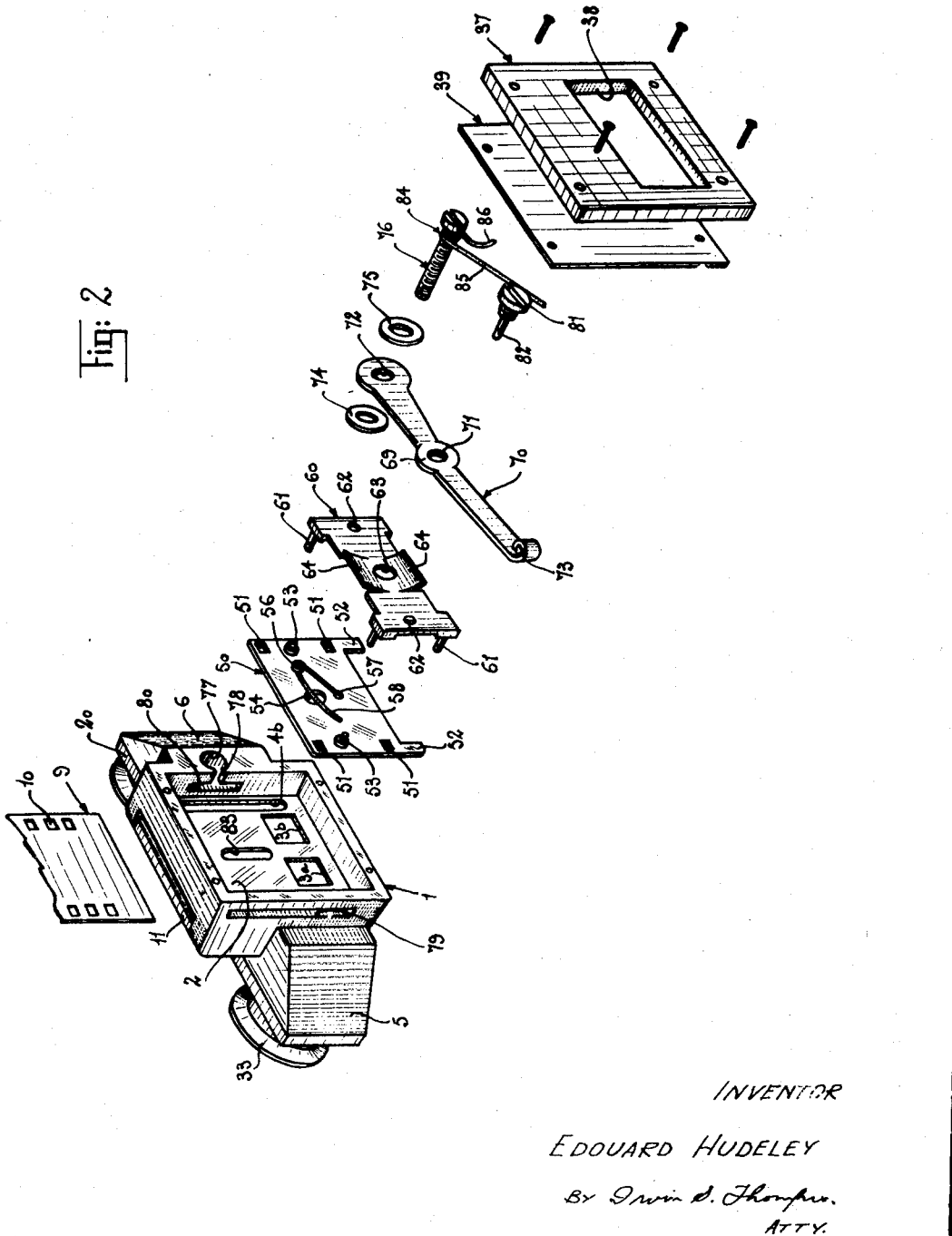
Fig. 2 is an exploded view of an embodiment of the driving mechanism for such a stereoscope, as seen from a direction opposed to that corresponding to Fig. 1.

A parallelopipedic recess is formed in the casing 1 behind the partition 2 as shown in Fig. 2, so as to carry the film driving mechanism, said recess or half-casing being closed by a plate 37 secured by means of screws for instance to the partitions 1, said plate 37 being provided in its lower section with a rectangular opening 38 with the interposition of a translucent light diffusing plate 39 between the plate 37 and the partition 2.

The different members forming the film-driving mechanism and housed inside the casing 1 are illustrated with further detail in Figs. 2 and 3.

Starting from the left hand side of Fig. 2, there is shown a carrier plate 50 adapted to slide between the uprights extending alongside of the partition 2; said plate being provided with two pairs of lateral openings 51 for the passage therethrough of the projections adapted to drive the film, two of said openings being provided on each side of the plate, while two lateral lugs 52 project beyond the lower edge of said plate. Said plate 50 carries furthermore a pivot or stud 53 directed rearwardly of the plate adjacent each of its lateral edges between the corresponding openings 51, a central opening being provided at 54. A hair pin shaped spring 55 is secured medially to said sliding carrier plate 50 by a screw 56 at its point of bending while the bent end of one of its arms engages a further opening 57 formed in the plate, the other free arm 58 of the spring 55 extending over the central opening 54.

The driving member 60 which has generally a rectangular shape is provided at its apices with four projections 61 adapted to be housed with some play inside the corresponding openings 51 of the plate 50, two lateral recesses 62 being provided furthermore in the plate 60 with a view to receiving with some clearance the corresponding pivots 53 on said plate 50, the driving plate 60 being furthermore provided with a central opening 63 registering with the opening 54 in the plate 50.

To either side of said central opening 63 are bent symmetrically on the side opposed to the studs 61, two abutment tongues 64 forming between them a widely open angle.

The spacing between the studs or projections 61 in a horizontal direction corresponds to the distance existing between the two rows of marginal perforations in the standard film 9, while their spacing in a vertical direction is equal to three times the spacing between successive perforations.

The practically flat lever 70 is provided with a central circular enlarged boss 69 adapted to serve as a push member and inside which is formed a tapped opening 71. The lever 70 is also provided with an opening 72 at one end, while its other end is wound, so as to form a sort of annulus 73. Two washers 74 and 75 are associated with said lever to either side of the port 72, while a screw 76 is adapted to extend through said port and to be screwed into a tapping, which is not illustrated, formed in the wall of the casing 1; the head of said screw engages a relieved recess 77 opening into the inside of the casing 1 through the horizontal groove 78. The side walls of said casing include furthermore two vertical slots 79 and 80 shaped so as to allow the passage through them of the lever 70, the shorter of these two slots 80 opening into the recess 77 and into the groove 78.

The mechanism includes furthermore a screw 81 adapted to be screwed into the central tapped opening 71 of the lever 70 and terminating with a smooth section 82 extending through the central openings 54 and 63 in the driving plate 60 and in the sliding carrier plate respectively, while a medial vertical groove 83 is provided inside the partition 2 to guide said smooth section 82 and a helical spring 84 surrounding the screw 76 includes a rectilinear arm 85 and an incurved bearing arm 86.

The mechanism which has just been described may be assembled as follows:

The sliding plate 50 provided with the spring 55 is introduced with the rocking driving plate 60 inside the casing 1, the studs or projections 61 engaging the openings 51 and, beyond the latter, the slots 4a and 4b. The two plates 50 and 60 are then secured to the lever 70 which has been engaged through the slots 79 and 80, the securing being obtained through the screw 81, the smooth bearing 82 on which engages the underside of the arm 58 of the spring on the plate 50. The lever is secured inside the casing by the screw 76 with the interposition of the washers 74 and 75, the arms 85 and 86 of the spring 84 engaging respectively the underside of the head of said screw 81 and the wall of the casing 1 under tensioning conditions which are sufficient for the system including the plates 50 and 60 to be urged upwardly together with the lever 70, as illustrated in Fig. 4. The housing for the mechanism is finally closed by the plates 39 and 37.

When the mirrors and eye-pieces have been duly positioned the assembly is finished by fitting the film-pressing member 11 on the eye-piece holder 20, the tenons 14 and 15 surrounded by the springs 29 and 30 engaging the blind openings 27 and 28 formed in said holder and shown in Fig. 4, while the eye-piece holder is secured to the casing, the film-pressing member being thus urged against the partition 2 of the casing by said springs 29 and 30.

The film 9 is then positioned inside the stereoscope along the film-guiding channel between the partition 2 and the film-pressing member 11; this positioning is executed after a preliminary receding movement of the projections or studs 61 out of said channel, as obtained by a slight downwardly directed thrust exerted by the ring 73 at the free end of the lever 70 (Figs. 3 and 5), the push member 69 on the latter setting the driving member 60 during this movement into the position illustrated in Fig. 5 with the smooth bearing 82 fitted coaxially inside the central opening 63 in the driving member 60.

Once the film has been engaged, the lever 70 is allowed to return upwardly under the action of the spring 84 (Fig. 4); said spring urges thus the screw 81 upwardly and through the agency of said screw it urges also the arm 58 of the spring carried by the plate 50 upwardly; the push member 69 on the lever 70 engages consequently the upper tongue 64 on the plate 60 which rocks forwardly; consequently the upper studs or projections 61 engage the perforations 10 in the film 9 registering with them; this provides thus, if required, the correct positioning of the film and the locking of the latter in said position.

To make the film progress, the lever 70 is caused to rock downwardly; during the first stage of this movement, illustrated in Fig. 6, the lever overcomes the resistance of the spring 84 and the central push member 69 on the lever 70 depresses the lower tongue 64 on the driving member 60, so as to produce the engagement of the lower projections 61 inside the perforations of the film registering with the latter, as provided by the rocking of said driving plate 60. As the movement continues, the central screw 81 engaging the lever drives the plate 50 downwardly through its smooth section 82 fitted in the opening 54 in said plate 50. The film is driven simultaneously downwardly until the lower lugs 52 on the plate engage the lower wall of the casing 1. The length of said lugs is defined in a manner such that the travel of the plate 50 and, consequently, that of the film may be equal to twice the interval between the successive perforations of the film, which corresponds to the distance between two successive pairs of pictures of the film.

The film having thus progressed, the lever is released, so that it is returned upwardly by the spring 84. During said movement, the driving plate or member rocks round the pivots 53 on the plate 50 and assumes the position illustrated in Fig. 7, so that the lower projections 61 of said rocking driving plate release the film perforations. The upward movement continuing then, the screw 81 engages the spring 58 on the plate 50 and urges the latter upwardly without any contact being possible between the central push member 69 on the lever 70 and the upper tongue 64 on the driving plate; a too marked rocking of the latter which might engage its upper projections 61 inside the perforations of the film is thus avoided through the interposition of said spring 55.

The system including the two plates 50 and 60 and the lever 70 is thus returned into its upper position, as illustrated in Fig. 4, at the end of its travel, the film urged by the film-pressing member 11 remaining in position. It is then possible to make a further pair of pictures progress into registry with the gates 3 and 12 of the casing and of the film-pressing member through a further lowering of the lever 70.

Obviously, it is necessary for the first stereoscopic pair examined to be positioned in registry with said gates 3 and 12, the exact registry for following pairs being obtained automatically in said case. Said first coincidence may be obtained by observing the first stereoscopic pair in the camera. However, for sake of simplicity, it may be remarked that the distance $d$ between the lower edges of the gates 3a and 3b and the lower surface of the casing 1 is constant, as shown in Fig. 3 and that it is sufficient to insert ahead of the first pair of pictures a leader section of a length $d'$ equal to $d$ (Fig. 8) with a view to obtaining simple means for ensuring the desired original registering between the first pair of pictures and the gates. The film is set in position in the stereoscope when the driving plate has receded (Fig. 5) and the film is urged downwardly until the lower edge of the strip is flush with the lower wall of the casing 1, said edge engaging for instance the operator's thumb held against said wall of the casing. The first coincidence or registering being thus obtained, the change of pictures is obtained automatically through mere operation of the lever.

The leader which does not carry any picture may carry the continuity or synopsis of the strip of pictures at the location A of Fig. 8, numbering digits being arranged on the central strip between the corresponding pictures of each pair so as to give a reference to the different views classified in an index printed on a bag adapted to contain the film when finished or inserted inside such a bag.

Fig. 9 illustrates as a modification a film 9' in which the central perforation 10' is associated with a pair of pictures, one central perforation corresponding thus to two perforations on either margin, said central perforation serving, if required, for the driving of the film.

Fig. 18 illustrates cross-sectionally in a horizontal plane the optical system of a stereoscope according to the invention in which the associated mirrors 7—31 and 8—32 are replaced by two prisms 90 and 91 provided each with two parallel total reflection surfaces respectively at 92—93 and 94—95.

Said prisms may be advantageously made of a suitable plastic material, say of injected polystyrene having a refraction index of about 1.6.

The film 97 to be viewed, carrying the two pictures 98 and 99 of a stereoscopic pair, is positioned in front of the two prisms, the axes of said pictures being brought into registry, through reflection on the surfaces of the prisms, as illustrated by the optic paths drawn in dot-and-dash lines at 100 and 101, with the optic axes of the two eye-pieces 102 and 103 respectively, the distance between said latter axes corresponding to the spacing between the observer's eyes.

It is possible, if desired, to insert in front of the pictures of the film two collecting lenses 104 and 105, the rear focal planes of said lenses coinciding substantially with the principal planes of the eye-pieces.

It is possible to use such a stereoscope in a reversible manner, i.e. for the direct obtention of a standard stereoscopic film, the eye-pieces being then replaced by viewtaking objectives preferably of the type having a large rear extension for a short focal distance of the type sold for instance under the name of Retro-focus.

It is also possible to resort to the arrangement which is less expensive illustrated in Fig. 11.

In said figure, the film to be impressed 110 is positioned behind two bevelled gates 111 and 112, the sizes of which are equal to those of the pictures to be obtained, say 9 x 10 mm. Two objectives 113 and 114 of the triplet lens type for instance are housed inside the objective carrier 115. The latter is fitted in an adjustable manner or otherwise on the front plate 116 of the camera; in the case where short-focus objectives are used, the depth of field is such that the telemetric means which are always expensive may be done away with.

In front of the view-taking objectives 113 and 114 are positioned two prisms of the double reflecting type, which provide for increasing the distance separating the optic axes from the reduced value of 14 mm. between the pictures to a value at least equal to the normal distance between human eyes which is a necessary condition for obtention of an impression of relief upon examination. Between the objectives and the prisms is revolubly fitted on a pivot 119 rigid with the plate of the apparatus a disc 120. Said disc carries a plurality of pairs of gauged circular openings or diaphragms on a plurality of radii, as shown at 121a, 121b, 122a, 122b, etc. Said pairs of openings or diaphragms are distributed in a manner such that their centers register for each pair with the centers of the objectives after a corresponding angular shifting of the disc 120. The diameters of the diaphragms of the successive pairs which are equal for the diaphragm of each pair may form the terms of a geometrical progression in conformity with the usual practice for photographic and kinematographic purposes or of any other suitable progression.

With such an arrangement and in the case of color films to be developed through reversal, it is necessary, with a view to obtaining a correct relief, to print a negative forming the complement of the original positive film and, starting from said negative, to print a final positive film while an optical step of turning around the picture is provided during this printing.

It is also possible to obtain indirectly a standard stereoscopic film through the arrangement known per se illustrated in Figs. 13 and 14.

Two photographic or kinematographic films are exposed in the usual manner during their progression in two coupled cameras, the optic axes of which are parallel and are spaced by a distance equal to or higher than the normal spacing between human eyes, which is about 64 mm., after which each of the films is caused to pass in succession through the arrangement considered, said films carrying for instance pictures of 18 x 18 mm. sizes.

The arrangement includes an objective 130, the focal distance of which is equal to say 100 mm. and forming a single objective with which are associated two auxiliary objectives 131 and 132 termed multiple objectives, the focal distance of which is smaller by one half and is equal in the present case to, say, 50 mm.

The film 134 obtained directly with its picture 135 measuring 18 x 18 mm. is positioned in the focal object plane of the single objective 130 and the picture obtained is then transformed by one of the multiple objectives, say the objective 131 and is projected on a film 136 positioned in the common image focal plane of the two multiple objectives as a picture 137, the size of which is 9 x 9 mm. in this example, the reduction in size of the images being provided in a ratio equal to that between the focal distances of the single objective and of the multiple objectives.

During the printing of one of the films 134, one of the multiple objectives, the objective 132 in the present case, is covered by a diaphragm 139 which allows the luminous rays to pass only through the opening 140 which cooperates in the formation of the picture 137, so as to avoid the formation of the other picture 138 of the pair on the picture location defined by interrupted lines. Said picture 138 is obtained subsequently after changing the film 134 and shifting the diaphragm, so as to cover the objective 131 in its turn.

Fig. 14 illustrates diagrammatically the different components of the arrangement of Fig. 13, the same reference numbers being used for both figures.

It should be remarked that the spacing between the multiple objectives is equal to the spacing between the pictures 137 and 138 of the standard film.

The different embodiments described and illustrated have obviously been disclosed only by way of an exemplification and may form the object of various modifications, without unduly widening the scope of the invention as defined in the accompanying claims. In particular, the stereoscope made in the present case of plastic material may be made of any other material such as metal for instance, the sizes of the pictures may be different and the location and the design of the different components may be modified, etc.

What I claim is:

1. A stereoscope for viewing stereoscopic pairs of pictures carried by a usual kinematographic supporting film strip provided with two marginal rows of perforations, the pictures of each stereoscopic pair being located side by side on either side of the longitudinal axis of the strip and two perforations of each row being associated to each stereoscopic pair, the stereoscope comprising a casing divided by a transverse vertical partition into a front compartment and a rear compartment, a presser plate disposed within said front compartment, and spaced from said partition, said partition defining with the presser plate a guideway for slidably receiving the film strip, said partition and presser plate being each provided with two openings located for registering with any pair of pictures of the film, and being further each provided with two lateral elongated slots each facing one of the rows of perforations in the film, optic means rigid with the side of the partition over which the film is to be engaged, a driving mechanism lodged within said rear compartment comprising a slidable system adapted to be moved between an upper position and a lower position, said mechanism also comprising actuating means for moving said system towards said lower position, return means for moving back said system towards said upper position, and stop means for limiting the movements of said system between said positions, said slidable system comprising a carrier plate sliding along said partition and carrying two rearwardly directed studs disposed on a horizontal line, said carrier plate being provided with a central hole and with a pair of lower apertures located below said line and each facing one of the slots in the partition, said slidable system further comprising a driving member provided with a central hole facing the central hole of said carrier plate and with two recesses each receiving the free end of one of said studs, said driving member further carrying a pair of driving projections passing through said pair of lower apertures, said studs and recesses defining an axis around which said driving member is adapted to rock between an operative position in which said projections engage the perforations in the film and an inoperative position in which said projections release the perforations, said driving member further carrying two rearwardly directed abutments on either side of said rocking axis, said actuating means comprising a lever pivotally secured to a side of the casing and extending across said partition beyond the opposite side of the casing, a section of said lever constituting a push member disposed between said abutments in the driving member, said push member carrying a forwardly directed rod passing with some clearance through the central holes of said carrier plate and driving member, said carrier plate carrying a bent spring extending across the central hole of this plate above said rod of the lever for limiting the rocking of the driving member during the return movement of the slidable system, said return means comprising a spring for upwardly urging said lever.

2. A stereoscope as claimed in claim 1, wherein the stop means for limiting the downward movement of the slidable system is constituted by the bottom of the stereoscope casing against which two lugs at the lower end of the carrier plate are adapted to bear at the end of each progression of the film.

3. A stereoscope as claimed in claim 1, wherein the driving member carries an upper pair of locking projections above the rocking axis, while the carrier plate is provided with two corresponding apertures each facing one of the slots in the partition, said locking projections being adapted to engage a pair of perforations of the film for a locking position of the driving member opposed to the operative position, the strength of the return spring being chosen higher than the strength of the bent spring.

References Cited in the file of this patent

UNITED STATES PATENTS

| | | |
|---|---|---|
| 958,367 | Clawson | May 17, 1910 |
| 1,017,672 | Jenkins | Feb. 20, 1912 |
| 1,815,208 | Moraz | July 21, 1931 |
| 2,282,151 | Austin | May 5, 1942 |
| 2,674,920 | Bennett | Apr. 13, 1954 |
| 2,778,288 | Steffen | Jan. 22, 1957 |
| 2,889,744 | Bonnano | June 9, 1959 |

FOREIGN PATENTS

| | | |
|---|---|---|
| 459,113 | Italy | Aug. 25, 1950 |